United States Patent
Wang et al.

(10) Patent No.: US 12,332,684 B2
(45) Date of Patent: Jun. 17, 2025

(54) SET AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Yaohui Wang, Beijing (CN); Lei Liu, Beijing (CN); Yanjun Sun, Beijing (CN); Zhengang Gao, Beijing (CN)

(73) Assignees: Beijing BOE Display Technology Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/796,575

(22) PCT Filed: Sep. 30, 2021

(86) PCT No.: PCT/CN2021/122311
§ 371 (c)(1),
(2) Date: Jul. 29, 2022

(87) PCT Pub. No.: WO2023/050357
PCT Pub. Date: Apr. 6, 2023

(65) Prior Publication Data
US 2024/0184325 A1  Jun. 6, 2024

(51) Int. Cl.
*G06F 1/16* (2006.01)
(52) U.S. Cl.
CPC .......... *G06F 1/1601* (2013.01); *G06F 1/1656* (2013.01); *G06F 2200/1612* (2013.01); *G06F 2200/1639* (2013.01)

(58) Field of Classification Search
CPC ............ G02F 1/133308; G06F 1/1601; G06F 1/1656; G06F 2200/1612; G06F 2200/1639
See application file for complete search history.

(56) References Cited

U.S. PATENT DOCUMENTS 10,180,596 B2 * 1/2019 Kim .................. G02F 1/133608
2011/0247252 A1   10/2011 Chen et al.
(Continued)

FOREIGN PATENT DOCUMENTS

CN    201705770 U  *  1/2011
CN    103221989 A      7/2013
(Continued)

*Primary Examiner* — Sagar Shrestha
*Assistant Examiner* — Peter Krim
(74) *Attorney, Agent, or Firm* — HOUTTEMAN LAW LLC

(57) ABSTRACT

Provided are a set and a display device. The set includes a display module including a display panel, a module mold frame, a front housing and a backplane. At least part of front housing is located on a light-emitting side of display panel and is disposed opposite to at least one side edge of module mold frame; front housing is provided with first and second connecting structures, the module mold frame has a first module mold frame side edge where a third connecting structure is disposed, the backplane of display module is provided with a fourth connecting structure. First and third connecting structures cooperate to limit the position of front housing in a plane parallel to a light-emitting surface of display module; second and fourth connecting structures cooperate to limit the position of front housing in a direction perpendicular to light-emitting surface.

16 Claims, 10 Drawing Sheets

(56) References Cited

U.S. PATENT DOCUMENTS

| | | | |
|---|---|---|---|
| 2015/0362962 A1* | 12/2015 | Lee | G06F 1/182 |
| | | | 361/679.21 |
| 2016/0300513 A1* | 10/2016 | Ren | H05K 5/0017 |
| 2020/0393712 A1* | 12/2020 | Jia | G02F 1/1347 |
| 2021/0373384 A1* | 12/2021 | Geng | G02B 6/0088 |

FOREIGN PATENT DOCUMENTS

| | | | |
|---|---|---|---|
| CN | 203057736 U | | 7/2013 |
| CN | 103442193 A | * | 12/2013 |
| CN | 203661186 U | | 6/2014 |
| CN | 203705770 U | * | 7/2014 |
| CN | 204422914 U | | 6/2015 |
| CN | 204945552 U | | 1/2016 |

\* cited by examiner

SET AND DISPLAY DEVICE

CROSS REFERENCE TO RELATED APPLICATION

This application is a National Phase Application filed under 35 U.S.C. 371 as a national stage of PCT/CN2021/122311, filed on Sep. 30, 2021.

TECHNICAL FIELD

The present disclosure relates to the technical field of display, in particular to a set and a display device.

BACKGROUND

Electronic products such as mobile phones and notebooks have become the mainstream products for daily office work and games thanks to their portability, but they also have a prominent shortage, that is, having a small display area. With the popularization of displays, people's requirements on displays are increasingly diversified. In terms of display area, an MNT (Monitor) display product is the best experience product for daily office work and games. However, being limited by the product structure, the existing MNT products are generally thick and heavy without portability, and are not suitable for scenes of daily office work and games. Hence, a display of portability is in urgent need at present.

SUMMARY

The present disclosure is directed to solve at least one of the technical problems in the existing technology, and provides a set and a display device, which can reduce the size, weight and cost of the set, so that the set exhibits the characteristics of thinness, lightweight and portability.

In order to accomplish the above object, the present disclosure provides a set, which includes a display module. The display module includes a display panel, a module mold frame, a front housing and a backplane, wherein at least part of the front housing is located on a light-emitting side of the display panel and is disposed opposite to at least one side edge of the module mold frame. The front housing is provided with a first connecting structure and a second connecting structure, the module mold frame has a first module mold frame side edge the first module mold frame side edge is provided with a third connecting structure, and the backplane of the display module is provided with a fourth connecting structure. The first connecting structure and the third connecting structure cooperate with each other to limit a position of the front housing in a plane parallel to a light-emitting surface of the display module. The second connecting structure and the fourth connecting structure cooperate with each other to limit the position of the front housing in a direction perpendicular to the light-emitting surface of the display module.

Optionally, a part of the display panel is exposed outside.

Optionally, the front housing is strip-shaped and is disposed opposite to the first module mold frame side edge.

Optionally, one of the first connecting structure and the third connecting structure includes a first limiting hole, the other of the first connecting structure and the third connecting structure includes a first limiting member, an axial direction of the first limiting hole is perpendicular to a light-emitting surface of the display module, and an outer peripheral surface of the first limiting member cooperates with an inner peripheral surface of the first limiting hole.

Optionally, shapes of orthographic projections of both the outer peripheral surface of the first limiting member and the inner peripheral surface of the first limiting hole on a plane parallel to the light-emitting surface of the display module include a rectangular shape or a square shape.

Optionally, one of the second connecting structure and the fourth connecting structure includes a second limiting hole, the other of the second connecting structure and the fourth connecting structure includes a second limiting member, an axial direction of the second limiting hole is parallel to the light-emitting surface of the display module, and the second limiting member and the second limiting hole cooperate with each other in a snap-fit manner.

Optionally, a plurality of first connecting structures and a plurality of second connecting structures are provided, and the plurality of first connecting structures are distributed along a length direction of the front housing, a number of third connecting structures and a number of the first connecting structures are the same, and the third connecting structures and the first connecting structures are disposed in a one-to-one correspondence. Additionally or alternatively, the plurality of second connecting structures are distributed along the length direction of the front housing, a number of the second connecting structures and a number of fourth connecting structures are the same, and the second connecting structures and the fourth connecting structures are disposed in a one-to-one correspondence.

Optionally, the set further includes a rear housing, at least part of the rear housing is located on a side away from the light-emitting surface of the display module, and forms a receiving space in-between with the backplane. A side of the rear housing corresponding to the first module mold frame side edge has a first rear housing flanging, a side of the front housing corresponding to the first module mold frame side edge has a first front housing flanging, the first front housing flanging being connected to the first rear housing flanging.

Optionally, one of the first rear housing flanging and the first front housing flanging is provided with a first cooperating portion, the other of the first rear housing flanging and the first front housing flanging is provided with a second cooperating portion, and the first cooperating portion and the second cooperating portion cooperate with each other to limit a relative position of the front housing and the rear housing in a direction perpendicular to the light-emitting surface of the display module.

Optionally, the set further includes a set mold frame disposed in the receiving space and connected to the backplane, and an orthographic projection of the set mold frame on the backplane at least covers an orthographic projection of a printed circuit board of the display module on the backplane.

Optionally, a side of the set mold frame corresponding to the first module mold frame side edge is provided with a first set mold frame flanging, the first set mold frame flanging is provided with a fifth connecting structure, a surface of the front housing opposite to the set mold frame is provided with a sixth connecting structure, and the fifth connecting structure and the sixth connecting structure cooperate with each other in a snap-fit manner.

Optionally, one of the fifth connecting structure and the sixth connecting structure includes a third limiting hole, the other of the fifth connecting structure and the sixth connecting structure includes a third limiting member, an axial direction of the third limiting hole is parallel to the light-emitting surface of the display module, and the third limiting member and the third limiting hole cooperate with each other in a snap-fit manner.

Optionally, a plurality of fifth connecting structures are provided, and the plurality of fifth connecting structures are distributed along a length direction of the set mold frame corresponding to the first set mold frame flanging, a number of sixth connecting structures and a number of the fifth connecting structures are the same, and the sixth connecting structures and the fifth connecting structures are disposed in a one-to-one correspondence.

Optionally, the set further includes a stand and an angle-adjustable component, wherein the stand is located on a side of the rear housing away from the light-emitting surface of the display module, and is connected to the rear housing through the angle-adjustable component; the angle-adjustable component is intended to adjust an included angle between the stand and the light-emitting surface of the display module within a preset angle range.

Optionally, a surface of the rear housing away from the light-emitting surface of the display module is provided with a limiting groove, the angle-adjustable component includes a fastening member, one end of the stand is disposed in the limiting groove in a damped rotation manner by the fastening member, and the fastening member is intended to adjust a damping amount of the stand.

Optionally, a raised and recessed structure is formed on at least one side wall of the limiting groove to increase friction force between the stand and the limiting groove.

Optionally, a surface of the rear housing facing the light-emitting surface of the display module is provided with a mounting protrusion on which the limiting groove is formed; and the mounting protrusion is provided with a first through hole penetrating through the mounting protrusion along a rotation axis of the stand, and an end of the stand is correspondingly provided with a second through hole; the fastening member includes a fastening threaded connector, a screw stem of the fastening threaded connector is inserted through the first through hole and the second through hole, and a nut of the fastening threaded connector is threaded to the screw stem to adjust the damping amount of the stand by screwing or unscrewing.

Optionally, a surface of the rear housing away from the light-emitting surface of the display module is provided with a receiving groove to receive the stand.

As another technical scheme, the present disclosure also provides a display device, which includes the set according to the present disclosure.

The present disclosure has the following beneficial effects: In the technical scheme of the set and display device according to the embodiments of the present disclosure, at least part of a front housing is located on a light-emitting side of the display panel and is disposed opposite to at least one side edge of a module mold frame, which facilitates minimizing the front housing, reducing the width of the side edge of the display module, and reducing the overall dimensions and the overall thickness of the set. Meanwhile, a first connecting structure and a second connecting structure are disposed on the front housing to cooperate with a third connecting structure disposed on a first module mold frame side edge of a module mold frame and a fourth connecting structure disposed on a backplane of the display module, respectively, so as to limit the position of the front housing in a plane parallel to the light-emitting surface of the display module and in a direction perpendicular to the light-emitting surface of the display panel. As compared to the existing technology that requires an additional metal frame to be fastened with the front housing, the present disclosure can dispense with the metal frame and reduce the weight of the set while ensuring structure connection stability, thereby decreasing the product cost and bringing forth thinness, lightweight and portability to the set.

LIST OF REFERENCE SIGNS

1—display module; 11—module mold frame; 111—first module mold frame side edge; 112, 44—escape portion; 113, 35—through hole; 12—first limiting hole; 13—backplane; 131, 411—bent portion; 132—positioning protrusion; 15—printed circuit board; 16—strip-shaped connection plate; 161—first mounting hole; 162—limiting protrusion; 17—display panel; 181—functional film material; 182—reflection sheet; 183—system board; 184—light guide plate; 185—backlight source; 186—buffer layer; 2—front housing; 21—first protrusion; 22—second protrusion; 23—first front housing flanging; 221—second limiting hole; 231—protrusion; 232—limiting clearance; 24—stopper; 25—third protrusion; 251—third limiting hole; 3—rear housing; 31—first rear housing flanging; 41—first set mold frame flanging; 32—limiting groove; 321—raised and recessed structure; 322—side wall; 323—bar-shaped groove; 33—mounting protrusion; 331—depression portion; 34—receiving groove; 4—set mold frame; 42—protective housing; 43—connection frame; 431—second mounting hole; 432—limiting hole; 5—stand; 6—angle-adjustable component; 61—fastening member; 611—screw stem; 612—nut; 7—button structure; 8—external connection hole.

DETAIL DESCRIPTION OF EMBODIMENTS

In order to make those skilled in the art better understand the technical scheme of the present disclosure, the set and the display device provided by the present disclosure are described in detail below with reference to the accompanying drawings.

Figure 1:
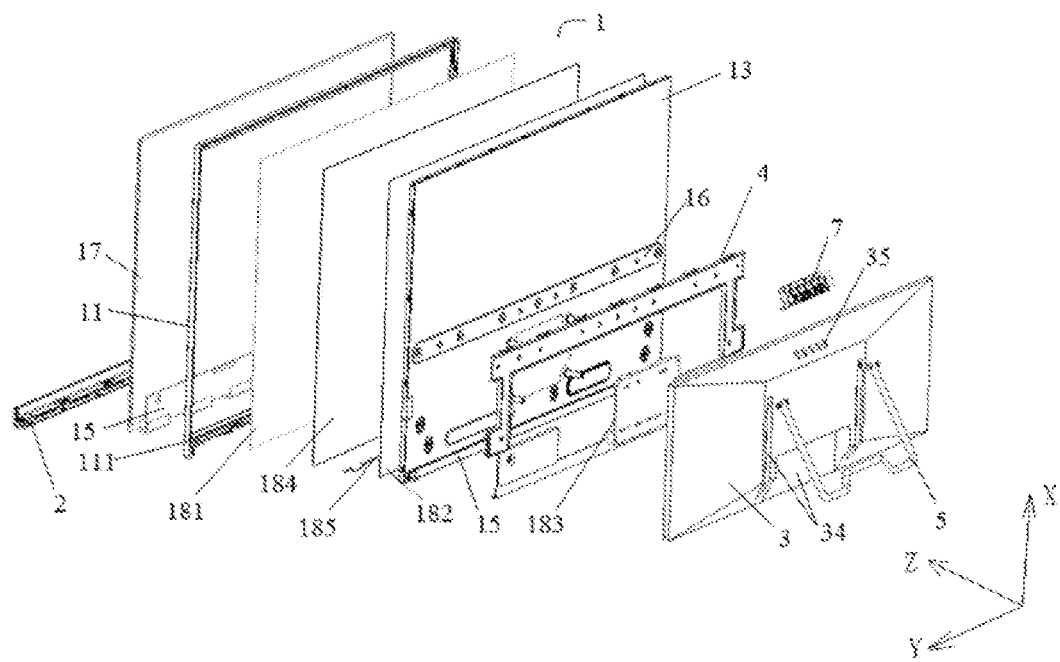
FIG. 1 is an exploded view of a set according to an embodiment of the present disclosure.
Figure 2A:
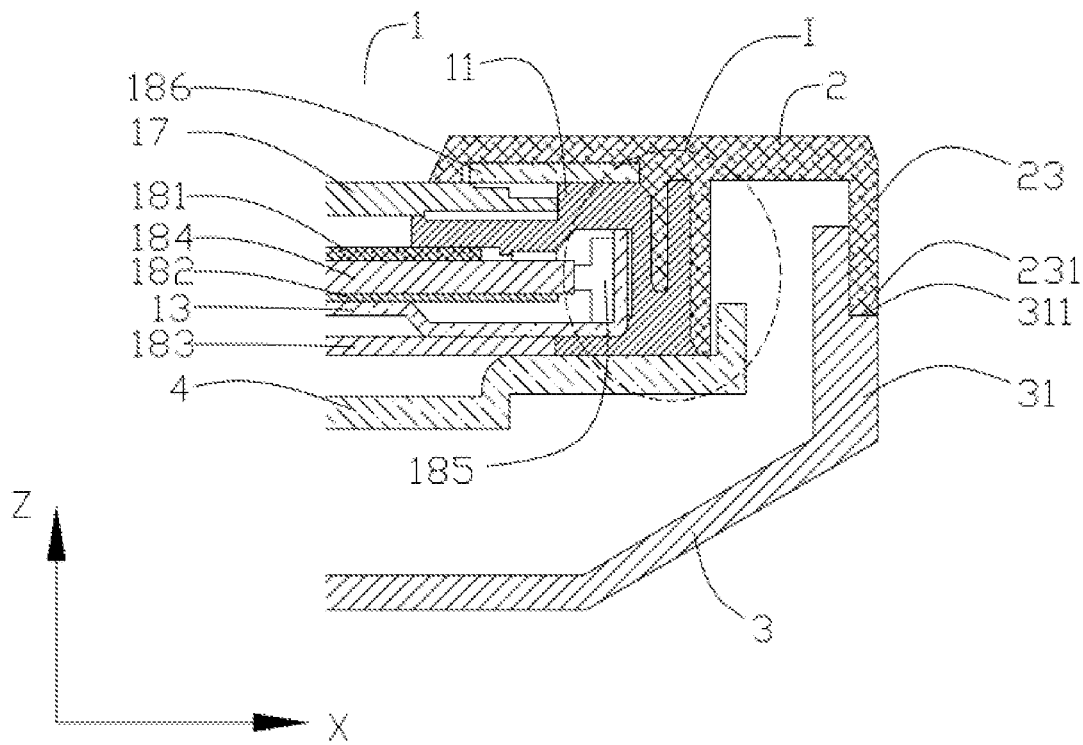
FIG. 2A is a partial cross-sectional view of the set at a position of a first connecting structure according to an embodiment of the present disclosure.
Figure 4A:
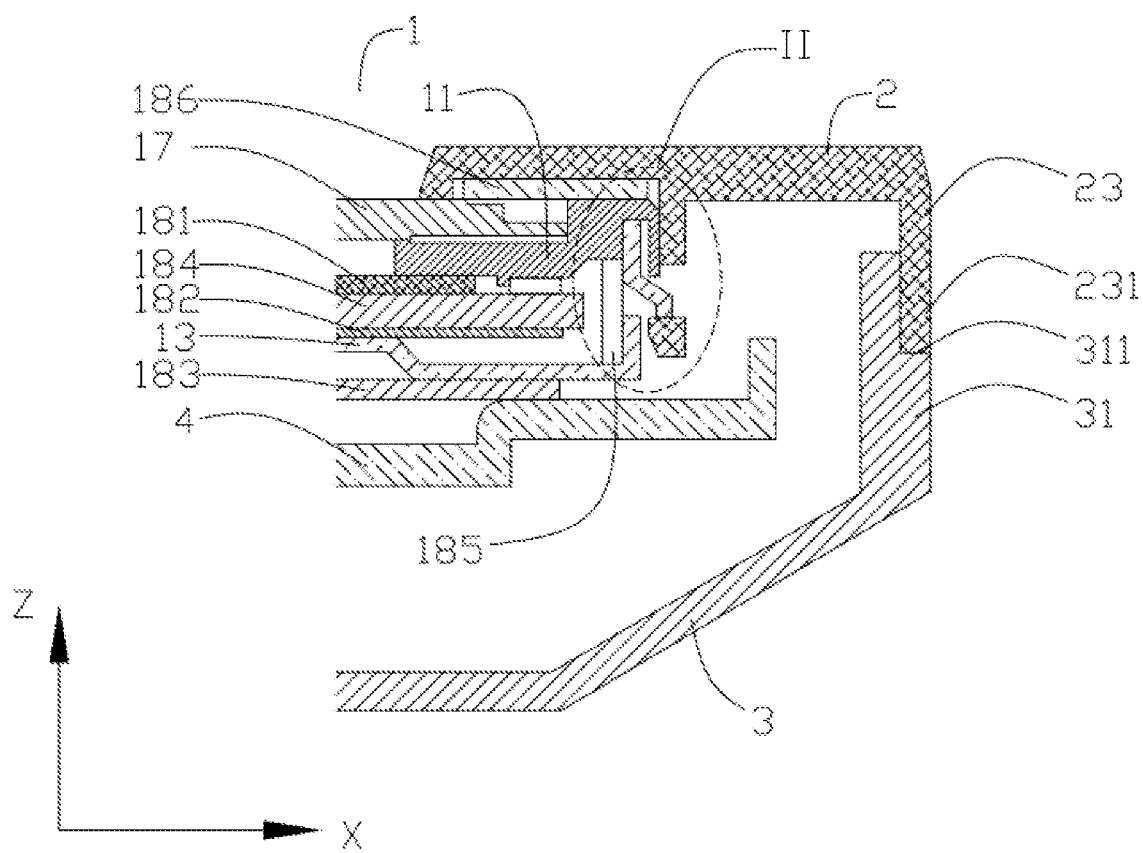
FIG. 4A is a partial cross-sectional view of the set at the position of a second connecting structure according to an embodiment of the present disclosure.
Figure 4B:
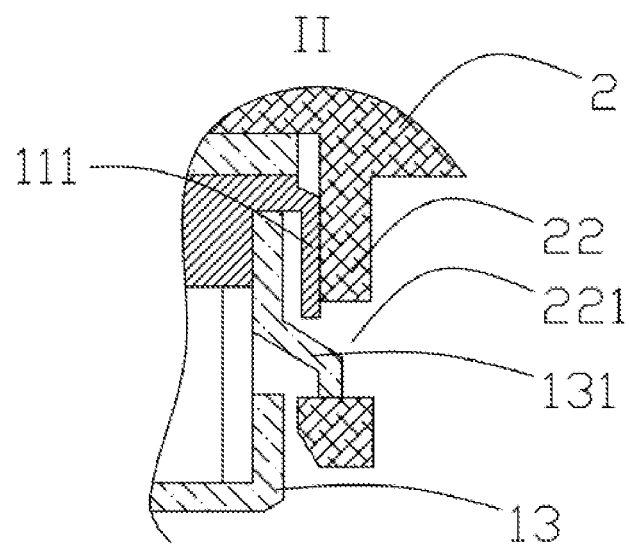
FIG. 4B is a partial enlarged view of an area II in FIG. 4A.

The set according to an embodiment of the present disclosure includes a display module 1, the structure of which is, for example, as shown in FIG. 1, FIG. 2A and FIG. 4A. The display module 1 includes a backplane 13, and a reflection sheet 182, a light guide plate 184, at least one layer of functional film material 181, a display panel 17, a module mold frame 11 and a front housing 2 which are sequentially positioned on one side of the backplane 13 away from a rear housing 3 in a direction away from the backplane 13 (i.e., the direction Z). The module mold frame 11 surrounds the reflection sheet 182, the light guide plate 184, the at least one layer of functional film material 181 and the display panel 17. A backlight source 185 is oppositely disposed on one side of the light incident surface of the light guide plate 184. The backlight source 185 is, for example, a light bar which is adhered to an inner side of a flanging of the backplane 13. A buffer layer 186 is further disposed between the front housing 2 and the module mold frame 11, and the buffer layer 186 is, for example, foam.

In practical applications, the functional film material 181 includes, for example, a lower diffusion film and a prism film, and optionally, an upper diffusion film or other functional film materials can be added.

As shown in FIG. 1, at least part of the front housing 2 is located on a side of the light-emitting surface of the display panel 17 and is disposed opposite to at least one side edge of the module mold frame 11. For example, the module mold frame 11 has a first module mold frame side edge 111, which is preferably a ground side edge (i.e., corresponding to a side of the set in contact with the ground). The front housing 2 can be disposed opposite to the first module mold frame side edge 111. Preferably, an orthographic projection of the front housing 2 on the light-emitting surface of the display panel 17 at least completely covers an orthographic projection of the first module mold frame side edge 111 on the light-emitting surface of the display panel 17, so as to ensure that a portion of the module mold frame 11 corresponding to the first module mold frame side edge 111 is completely hidden in the front housing 2.

It should be noted that the first module mold frame side edge 111 refers to one of a plurality of side edges of the module mold frame 11. For example, when the outline of the light-emitting surface of the display panel 17 is rectangular, the first module mold frame side edge 111 refers to one of four side edges of the module mold frame 11. For example, when the outline of the light-emitting surface of the display panel 17 is rectangular, the module mold frame 11 is divided into four parts according to four edges of the display panel 17, and each part is referred to as a side edge.

In some optional embodiments, a portion of the display panel 17 can be exposed outside, i.e., this portion is not covered by the front housing 2. This arrangement facilitates minimizing the front housing, reducing the width of the side edge of the display module 1, and reducing the overall dimensions and the overall thickness of the set. It should be noted that, the side edge of the display panel 17 can be surrounded by the module mold frame 11. In this case, the portion of the front surface of the display panel 17 not covered by the front housing 2 is exposed outside, while at the side of the display panel 17 it is the module mold frame 11 that is exposed outside. Optionally, foam is disposed between the module mold frame 11 that surrounds the side edges of the display panel 17 and the display panel 17, which may have a buffer effect and improve the reliability of the set.

In some optional embodiments, the front housing 2 is strip-shaped and is disposed opposite to the first module mold frame side edge 111. In this way, the other three side edges of the display panel 17 are not covered by the front housing 2 but are directly exposed outside. Hence, only one side of the display panel 17 has the front housing 2 while the other three sides are without the front housing 2, which is beneficial to achieve an aesthetic appearance, thinness and lightweight of the set.

In some optional embodiments, the front housing 2 is made of a lightweight, low cost, non-metallic material, such as plastic.

In some optional embodiments, the front housing 2 and the module mold frame 11 are made of a same material, so as to ensure a uniform and aesthetic appearance of the set.

Moreover, the front housing 2 is provided with a first connecting structure and a second connecting structure. The first module mold frame side edge 111 of the module mold frame 11 is provided with a third connecting structure. The backplane 13 is provided with a fourth connecting structure. The first connecting structure and the third connecting structure cooperate with each other, so as to limit the position of the front housing 2 in a plane parallel to the light-emitting surface of the display panel 17 (i.e., a plane in which direction X and direction Y are located as shown in FIG. 1). The second connecting structure and the fourth connecting structure cooperate with each other, so as to limit the position of the front housing 2 in a direction perpendicular to the light-emitting surface of the display panel 17 (i.e., the direction Z).

By providing a first connecting structure and a second connecting structure on the front on housing 2, the first connecting structure and the second connecting structure can cooperate with a third connecting structure disposed on the first module mold frame side edge 111 of the module mold frame 11 and a fourth connecting structure disposed on a backplane 13, respectively, so as to limit the position of the housing 2 in a plane parallel to the light-emitting surface of the display panel 17 and in a direction perpendicular to the light-emitting surface of the display panel 17. As compared to the existing technology that requires an additional metal frame to be fastened with the front housing, the present disclosure can dispense with the metal frame and reduce the weight of the set while ensuring structure connection stability, thereby decreasing the product cost and bringing forth thinness, lightweight and portability to the set.

Figure 2B:
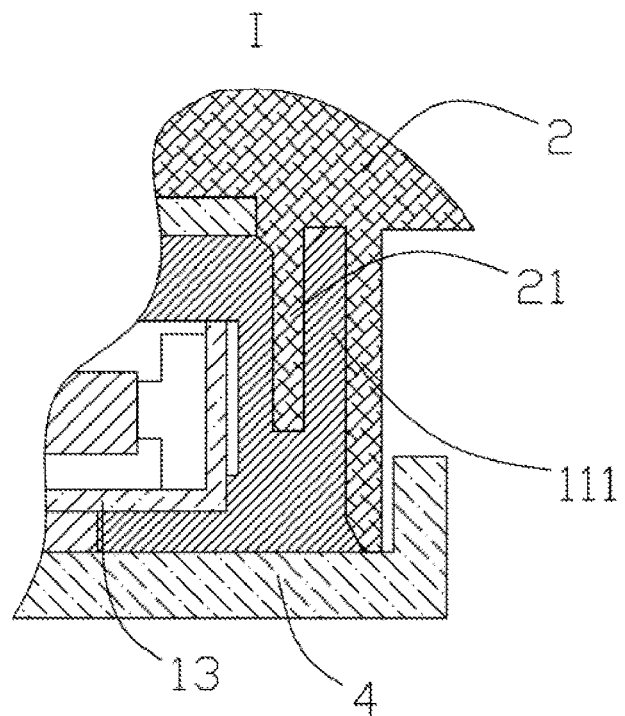
FIG. 2B is a partial enlarged view of an area I in FIG. 2A.
Figure 3:
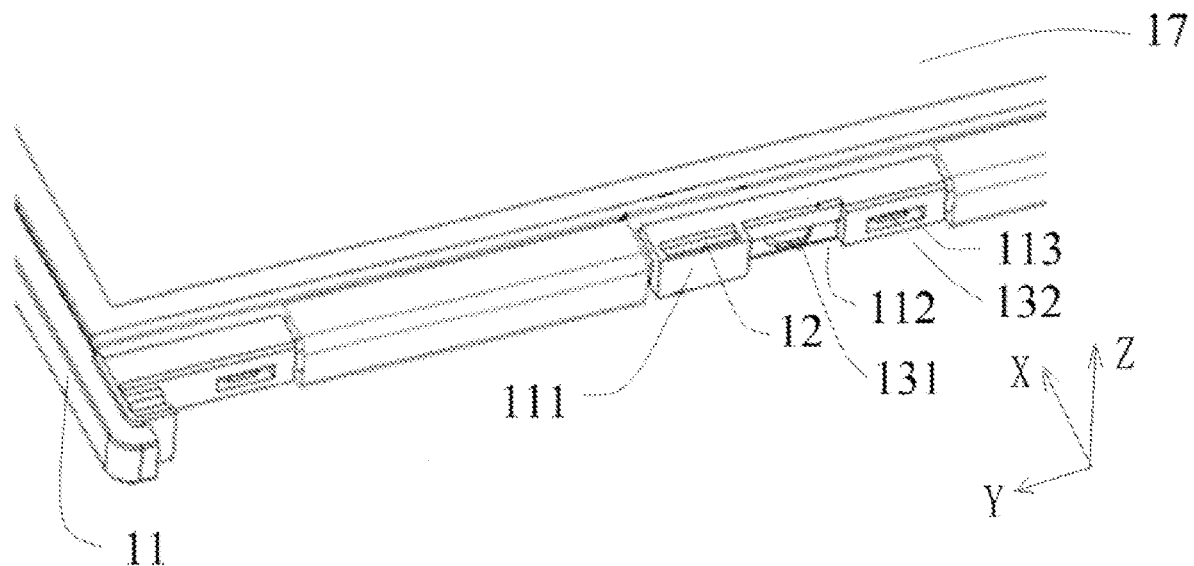
FIG. 3 is a partial structural view of a display module according to an embodiment of the present disclosure.

In some optional embodiments, one of the first connecting structure and the third connecting structure includes a first limiting hole, and the other of the first connecting structure and the third connecting structure includes a first limiting member. An axial direction of the first limiting hole is perpendicular to the light-emitting surface of the display panel 17 (i.e., parallel to the direction Z), and an outer peripheral surface of the first limiting member cooperates with an inner peripheral surface of the first limiting hole, so as to limit the position of the front housing 2 in a plane parallel to the light-emitting surface of the display panel 17. For example, referring to FIG. 3 to FIG. 6, the first connecting structure includes a first limiting member. As shown in FIG. 2B, the first limiting member is a first protrusion 21 disposed on a surface of the front housing 2 opposite to the first module mold frame side edge 111. Correspondingly, as shown in FIG. 3, the third connecting structure includes a first limiting hole 12, and the first limiting hole 12 penetrates through the first module mold frame side edge 111 along a direction perpendicular to the light-emitting surface of the display panel 17 (i.e., the direction Z). The first protrusion 21 is inserted into the first limiting hole 12, and an outer peripheral wall of the first protrusion 21 cooperates with an inner peripheral surface of the first limiting hole 12, so as to limit the position of the front housing 2 in a plane parallel to the light-emitting surface of the display panel 17 (i.e., the plane in which the direction X and direction Y are located as shown in FIG. 3). Of course, in practical applications, the structure according to which the first connecting structure and the third connecting structure cooperate with each other may also be any other structure that is capable of limiting the position of the front housing 2, and the present disclosure is not particularly limited to this.

In some optional embodiments, shapes of orthographic projections of both the outer peripheral surface of the first limiting member and the inner peripheral surface of the first limiting hole on a plane parallel to the light-emitting surface of the display panel 17 include a rectangular shape or a square shape. For example, as shown in FIG. 3, the orthographic projection of the inner peripheral surface of the first limiting hole 12 on the plane parallel to the light-emitting surface of the display panel 17 is of a rectangular shape, and the orthographic projection of the outer peripheral surface of the first protrusion 21 on the plane parallel to the light-emitting surface of the display panel 17 has the same shape as the orthographic projection of the first limiting hole 12 on the plane parallel to the light-emitting surface of the display panel 17. Of course, in practical applications, the orthographic projections of the outer peripheral surface of the first limiting member and the inner peripheral surface of the first limiting hole on a plane parallel to the light-emitting surface of the display panel 17 can be of any other shapes, as long as the position of the front housing 2 in a plane parallel to the light-emitting surface of the display panel 17 can be limited.

In some optional embodiments, one of the second connecting structure and the fourth connecting structure includes a second limiting hole, and the other of the second connecting structure and the fourth connecting structure includes a second limiting member. An axial direction of the second limiting hole is parallel to the light-emitting surface of the display panel 17. The second limiting member and the second limiting hole cooperate with each other in a snap-fit manner. For example, as shown in FIG. 4B to FIG. 6, the second connecting structure includes a second protrusion 22 disposed on a surface of the front housing 2 opposite to the first module mold frame side edge 111, and the second protrusion 22 is provided with a second limiting hole 221. Correspondingly, as shown in FIG. 3 and FIG. 4A, the backplane 13 is provided with a second limiting member, and the second limiting member is a bent portion 131 bent from a side edge of the backplane 13 toward a direction close to the second protrusion 22 (i.e., the direction X in FIG. 4A). When the front housing 2 is mounted, the bent portion 131 is capable of generating an elastic deformation under an extrusion action of the second protrusion 22, so as to ensure smooth mounting of the front housing 2 in place. After the front housing 2 is mounted in place, the bent portion 131 can be reset into the second limiting hole 221 on the second protrusion 22 under an elastic force of the bent portion 131 itself, so that the bent portion 131 and the second limiting hole 221 are in snap-fit, so as to limit the position of the front housing 2 in a direction perpendicular to the light-emitting surface of the display panel 17. Of course, in practical applications, the second connecting structure and the fourth connecting structure may also adopt any other connecting structure capable of achieving snap-fit, and the present disclosure is not particularly limited to this.

It should be noted that, in the above embodiment, the cooperating structure adopted by the second connecting structure and the fourth connecting structure can not only limit the position of the front housing 2, but also engage the front housing 2 with the backplane 13, so that the front housing 2 is fixed and the connection stability of the front housing 2 is improved. However, the present disclosure is not particularly limited to this. In practical applications, the cooperating structure adopted by the second connecting structure and the fourth connecting structure may also limit the position the position of the front housing 2 only. In this case, the cooperating structure adopted by the first connecting structure and the third connecting structure may not only limit the position of the front housing 2 but also engage the front housing 2 with the rear housing 3, which can also realize the fixing of the front housing 2. Alternatively, both of the cooperating structure adopted by the second connecting structure and the fourth connecting structure and the cooperating structure adopted by the first connecting structure and the third connecting structure only limit the position of the front housing 2. In such case, the front housing 2 may also be fixed by utilizing such position limiting only. Alternatively, the front housing 2 can be fixed by providing an additional connecting structure or in any manner, and the present disclosure is not particularly limited to this.

In some optional embodiments, a plurality of first connecting structures and a plurality of second connecting structures are provided, and the plurality of first connecting structures are distributed, preferably uniformly distributed, along a length direction of the front housing 2 (i.e., the direction Y in FIG. 1). A number of third connecting structures and a number of the first connecting structures are the same, and the third connecting structures and the first connecting structures are disposed in a one-to-one correspondence. Additionally or alternatively, the plurality of second connecting structures are distributed, preferably uniformly distributed, along the length direction of the front housing 2. A number of the second connecting structures and a number of fourth connecting structures are the same, and the second connecting structures and the fourth connecting structures are disposed in a one-to-one correspondence. In this way, the uniformity of force acting upon the front housing 2 in the length direction of the front housing 2 can be improved, and further the connection stability of the front housing 2 can be improved.

It should be noted that, as shown in FIG. 3, an escape portion 112 is further disposed on the first module mold frame side edge 111 of the module mold frame 11 at a position corresponding to the second protrusion 22 on the front housing 2. As such, the second protrusion 22 on the front housing 2 can be inserted into the escape portion 112 to ensure smooth mounting of the front housing 2 in place.

In some optional embodiments, as shown in FIG. 3, a through hole 113 is further disposed on the first module mold frame side edge 111 of the module mold frame 11. Correspondingly, a positioning protrusion 132 is disposed on a surface of the backplane 13 opposite to the first module mold frame side edge 111, and the positioning protrusion 132 is located in the through hole 113, so as to limit a relative position of the backplane 13 and the module mold frame 11.

In some optional embodiments, as shown in FIG. 2A and FIG. 4A, the set further includes a rear housing 3 on a side away from the light-emitting surface of the display panel 17. A receiving space is formed between the rear housing 3 and the backplane 13. Specifically, the surface of the rear housing 3 opposite to the backplane 13 is a depression surface recessed in a direction away from the backplane 13, and the depression surface and the backplane 13 form the receiving space. Additionally, the rear housing 3 has a first rear housing flanging 31 on a side of the rear housing corresponding to the first module mold frame side edge 111. That is, the first rear housing flanging 31 and the first module mold frame side edge 111 are positioned on the same side. The front housing 2 has a first front housing flanging 23 on a side of the rear housing corresponding to the first module mold frame side edge 111. That is, the first front housing flanging 23 and the first module mold frame side edge 111 are positioned on the same side, and the first front housing flanging 23 is connected to the first rear housing flanging 31. The rear housing 3 and the front housing 2 are connected through the first front housing flanging 23 and the first rear housing flanging 31, which can completely cover the portion of the display module 1 corresponding to the first module mold frame side edge 111.

It should be noted that the first rear housing flanging 31 refers to a portion of the rear housing 3 extending to one side of the display panel 17, and this portion is located on the same side of the display panel 17 as the first module mold frame side edge 111. Similarly, the first front housing flanging 23 refers to a portion of the front housing 2 extending to one side of the display panel 17, and this portion is located on the same side of the display panel 17 as the first module mold frame side edge 111.

Figure 6A:
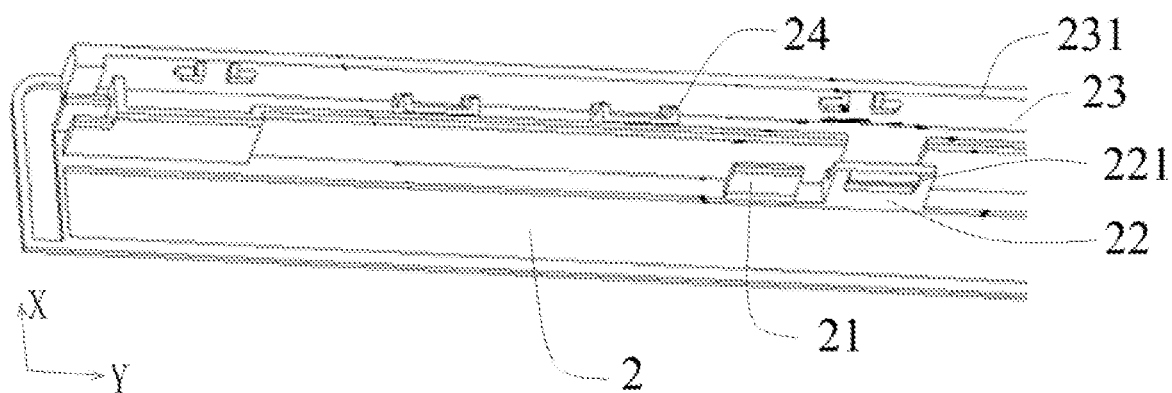
FIG. 6A is a partial structural view of a front housing adopted in an embodiment of the present disclosure.
Figure 6B:
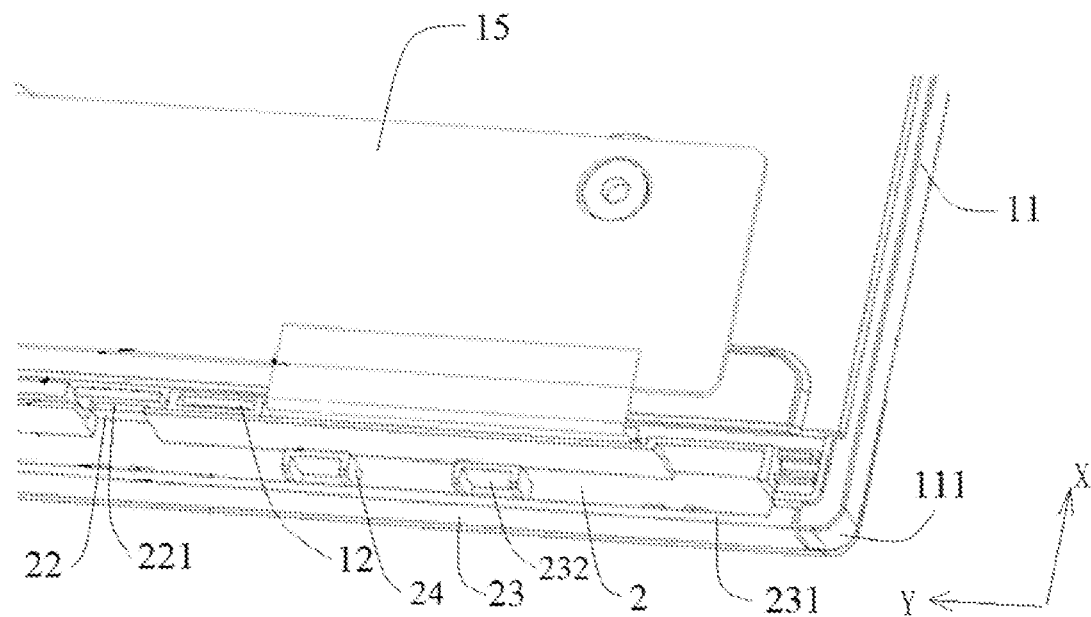
FIG. 6B is a partial back structural view of the display module adopted in an embodiment of the present disclosure with the front housing mounted.
Figure 6C:
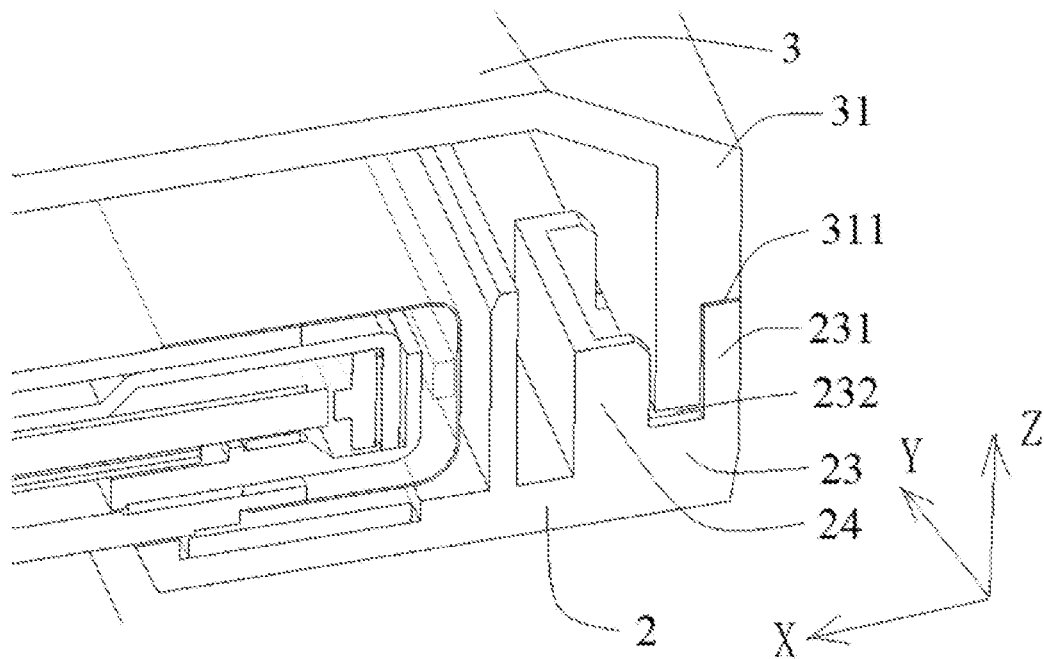
FIG. 6C is a partial cross-sectional view of the set at the position of a first cooperating portion according to an embodiment of the present disclosure.

The first front housing flanging 23 and the first rear housing flanging 31 can be connected in various manners. As shown in FIGS. 2A and 4A, one of the first rear housing flanging 31 and the first front housing flanging 23 is provided with a first cooperating portion, the other of the first rear housing flanging 31 and the first front housing flanging 23 is provided with a second cooperating portion, and the first cooperating portion and the second cooperating portion cooperate with each other, so as to limit a relative position of the front housing 2 and the rear housing 3 in a direction perpendicular to the light-emitting surface of the display panel 17 (i.e., the direction Z). For example, as shown in FIG. 6C, the first cooperating portion is a depression portion 311 disposed on the first rear housing flanging 31, and correspondingly, the second cooperating portion includes a protrusion 231 disposed on the first front housing flanging 23, and the protrusion 231 and the depression portion 311 cooperate with each other, so as to limit the relative position of the front housing 2 and the rear housing 3 in the direction perpendicular to the light-emitting surface of the display panel 17 (i.e., the direction Z). Of course, in practical applications, the first cooperating portion and the second cooperating portion may also adopt any other cooperating structure, as long as the a relative position of the front housing 2 and the rear housing 3 in the direction perpendicular to the light-emitting surface of the display panel 17 can be limited.

In some optional embodiments, as shown in FIG. 6C, the second cooperating portion further includes a stopper 24 disposed on the front housing 2. The stopper 24 and the protrusion 231 are disposed at an interval in a direction parallel to the light-emitting surface of the display panel 17 (for example, the direction X) to form a limiting clearance 232. A side wall portion of the first rear housing flanging 31 forming the depression portion 311 is disposed in the limiting clearance 232, so that the relative position of the front housing 2 and the rear housing 3 in a plane parallel to the light-emitting surface of the display panel 17 can be limited.

It should be noted that, in practical applications, the first front housing flanging 23 and the first rear housing flanging 31 can be connected in any other manners. For example, the first front housing flanging 23 and the first rear housing flanging 31 can be connected in a separable and detachable manner, such as by contact, butt-joint, snap-fit, and the like.

In some optional embodiments, as shown in FIG. 1, the rear housing 3 covers only a partial area of the backplane 13, which can be specifically an area below a strip-shaped connection plate 16 of the backplane 13. In this way, the rear housing can be minimized, and the overall weight of the set can be further reduced. In this case, the side edge of the rear housing 3 opposite to the first rear housing flanging 31 can be separably and detachably connected to the backplane 13, such as by contact, butt joint, snap-fit, and the like. The other two side edges of the rear housing 3 can be separably and detachably connected to two corresponding side edges of the module mold frame 11, such as by contact, butt-joint, snap-fit, and the like.

In some optional embodiments, the rear housing 3 is made of a lightweight, low cost, non-metallic material, such as plastic.

In some optional embodiments, the rear housing 3, the front housing 2 and the module mold frame 11 are made of a same material, so as to ensure a uniform and aesthetic appearance of the set.

Figure 7A:
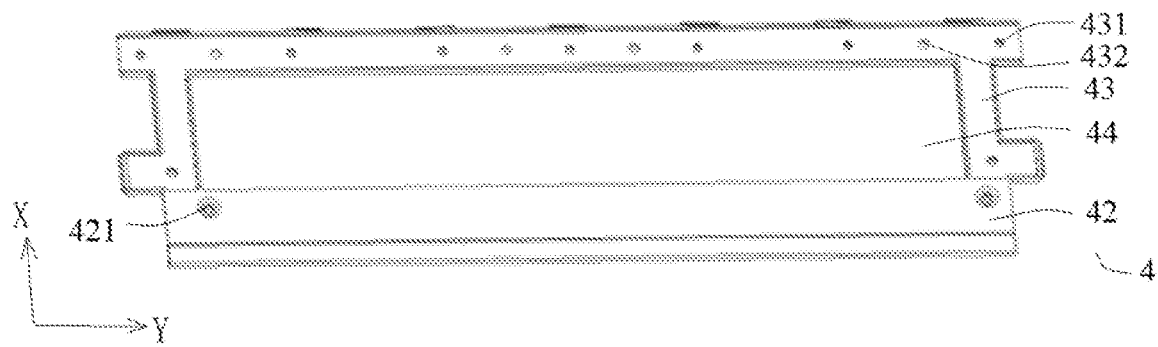
FIG. 7A is a structural view of a set mold frame adopted in an embodiment of the present disclosure.
Figure 7B:
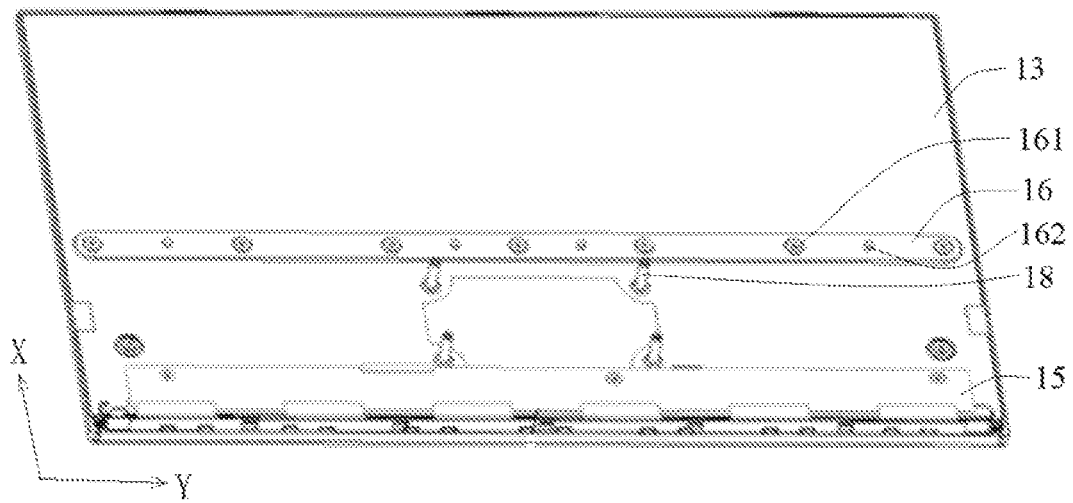
FIG. 7B is a back structural view of the display module adopted in an embodiment of the present disclosure.
Figure 7C:
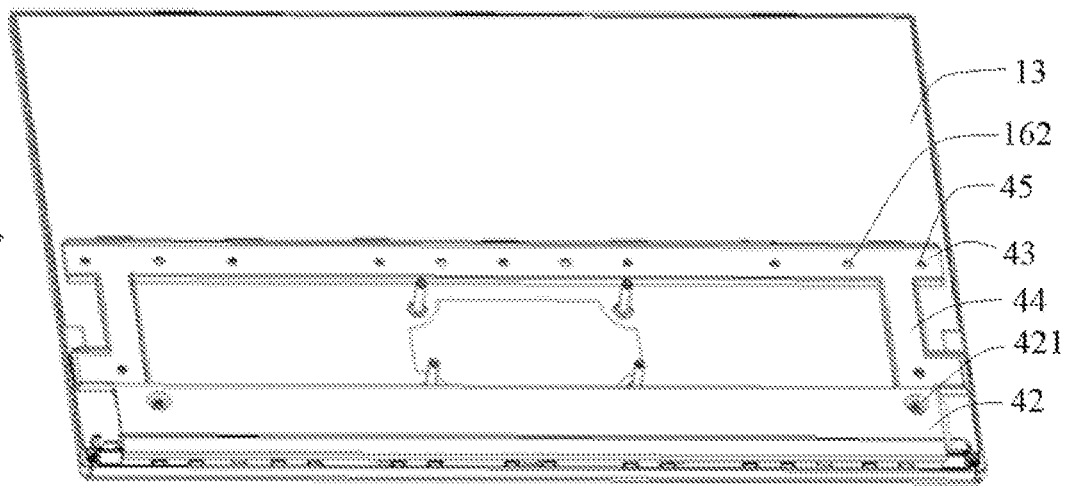
FIG. 7C is a back structural view of the display module according to an embodiment of the present disclosure with the set mold frame mounted.

In some optional embodiments, referring to FIG. 7A to FIG. 7C, the set further includes a set mold frame 4. The set mold frame 4 is disposed in the receiving space and connected to the backplane 13. An orthographic projection of the set mold frame 4 on the backplane 13 at least covers an orthographic projection of the printed circuit board 15 of the display module 1 on the backplane 13, so as to protect the printed circuit board 15. In this way, a protective case for protecting the printed circuit board 15 in the existing technology can be omitted, so that the weight of the set can be further reduced, the product cost can be reduced, and the set exhibits the characteristics of thinness, lightweight and portability.

In some optional embodiments, the set mold frame 4 is made of a lightweight, low cost, non-metallic material, such as plastic.

Figure 5:
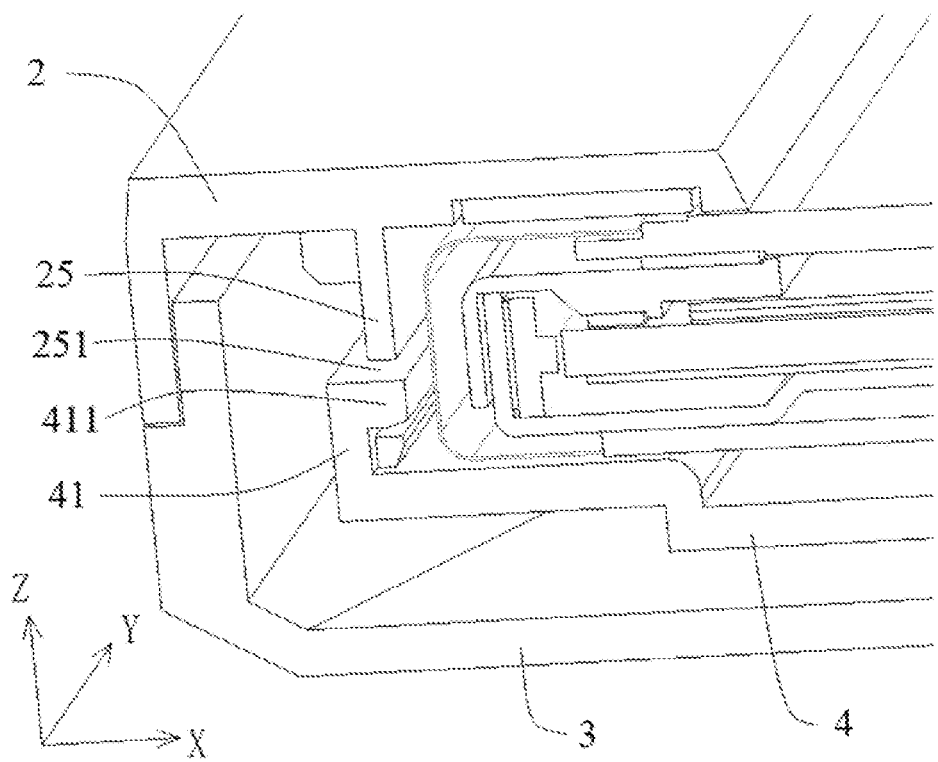
FIG. 5 is a partial cross-sectional view of the set at the position of a sixth connecting structure according to an embodiment of the present disclosure.

In some optional embodiments, as shown in FIG. 5, a first set mold frame flanging 41 is disposed on a side of the set mold frame 4 corresponding to the first module mold frame side edge 111. That is, the first set mold frame flanging 41 is located on the same side as the first module mold frame side edge 111. The first set mold frame flanging 41 is provided with a fifth connecting structure, and the surface of the front housing 2 opposite to the set mold frame 4 is provided with a sixth connecting structure. The fifth connecting structure and the sixth connecting structure cooperate with each other in a snap-fit manner. By snap-fitting the fifth connecting structure with the sixth connecting structure, the connection reliability of the front housing 2 can be further improved. For example, in some optional embodiments, one of the fifth connecting structure and the sixth connecting structure includes a third limiting hole, and the other of the fifth connecting structure and the sixth connecting structure includes a third limiting member. An axial direction of the third limiting hole is parallel to the light-emitting surface of the display panel 17 (i.e., a plane where the direction X and direction Y are located as shown in FIG. 5), and the third limiting member and the third limiting hole cooperate with each other in a snap-fit manner. As shown in FIG. 5, the sixth connecting structure includes a third protrusion 25 disposed on a surface of the front housing 2 opposite to the first module mold frame side edge 111, and the third protrusion 25 is provided with a third limiting hole 251. Correspondingly, a third limiting member is disposed on the first set mold frame flanging 41 of the set mold frame 4. The third limiting member is a bent portion 411 bent from the first set mold frame flanging 41 toward a direction close to the third protrusion 25 (i.e., the direction X). During mounting, the front housing 2 is mounted at first, and then the set mold frame 4 is mounted. When the set mold frame 4 is mounted, the third protrusion 25 can generate elastic deformation under the extrusion action of the bent portion 411, so as to ensure smooth mounting of the set mold frame 4 in place. After the set mold frame 4 is mounted in place, the bent portion 411 can be reset into the third limiting hole 251 on the third protrusion 25 under an elastic force of itself, so that the snap-fit of the bent portion 411 and the third limiting hole 251 is realized, and the relative position of the set mold frame 4 and the front housing 2 in the direction perpendicular to the light-emitting surface of the display panel 17 is defined. Of course, in practical applications, the fifth connecting structure and the sixth connecting structure may also adopt any other connecting structure capable of achieving snap-fit, and the present disclosure is not particularly limited to this.

In some optional embodiments, a plurality of fifth connecting structures are provided. The plurality of fifth connecting structures are distributed, preferably uniformly distributed, along the length direction of the side edge 41 of the set mold frame 4. A number of sixth connecting structures and a number of the fifth connecting structures are the same, and the sixth connecting structures and the fifth connecting structures are disposed in a one-to-one correspondence. In this way, the uniformity of force acting upon the front housing 2 and the set mold frame 4 in their length direction can be improved, and the connection stability of the front housing 2 and the set mold frame 4 can be further improved.

In some optional embodiments, as shown in FIGS. 7A to 7C, the set mold frame 4 includes a protective housing 42 for covering the printed circuit board 15 and a connection frame 43. The protective housing 42 covers the printed circuit board 15 and can be fixedly connected to the backplane 13 by screws. The connection frame 43 and the protective housing 42 are integrated or are connected by welding, and an escape portion 44 is formed between the connection frame 43 and the protective housing 42, so as to reserve a space for the system board 183 mounted on the backplane 13. Specifically, as shown in FIG. 7B, a plurality of mounting posts 18, for example, four mounting posts 18 are disposed on the backplane 13, so as to fix the system board 183.

In some optional embodiments, as shown in FIG. 7C, the connection frame 43 can be fixedly connected to the backplane 13 through a screw 45. Specifically, as shown in FIG. 7B, a strip-shaped connection plate 16 is disposed on a surface of the backplane 13 away from the light-emitting surface of the display panel 17, so as to fix and limit the position of the connection frame 43. Specifically, a plurality of first mounting holes 161 are provided on the strip-shaped connection plate 16 at intervals along the length direction of the strip-shaped connection plate 16 (i.e., the direction Y). As shown in FIG. 7A, a plurality of second mounting holes 431 are correspondingly provided on the connection frame 43, and the respective screws 45 are mounted in the second mounting holes 431 and the first mounting holes 161 corresponding to the second mounting holes 431 in a one-to-one correspondence, so as to achieve fixed connection of the connection frame 43 and the backplane 13. Of course, in practical applications, the protective housing 42 and the backplane 13, as well as the connection frame 43 and the backplane 13 may also be connected in any other manners, and the present disclosure is not particularly limited to this.

In some optional embodiments, as shown in FIGS. 7A and 7B, a plurality of limiting protrusions 162 are disposed on the strip-shaped connection plate 16 at intervals along the length direction of the strip-shaped connection plate 16, and a plurality of limiting holes 432 are correspondingly disposed on the connection frame 43, and the respective protrusions 162 cooperate with the respective limiting holes 432 in a one-to-one correspondence, so as to limit the relative position of the connection frame 43 and the strip-shaped connection plate 16. Optionally, the plurality of limiting protrusions 162 and the plurality of first mounting holes 161 are alternately disposed. Correspondingly, a plurality of limiting holes 432 and a plurality of second mounting holes 431 are alternately disposed, so as to ensure that the connection frame 43 and the strip-shaped connection plate 16 are uniformly stressed.

Figure 8A:
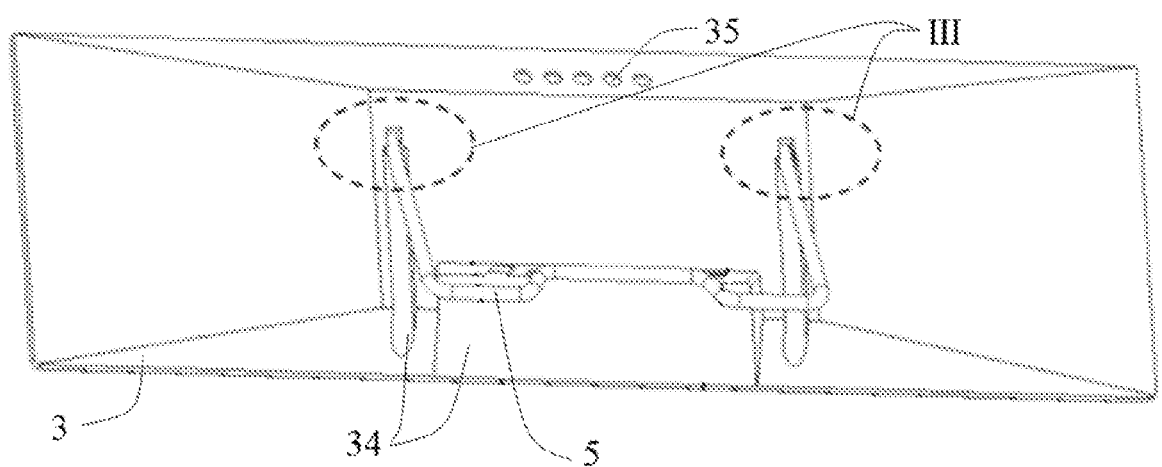
FIG. 8A is a structural view of a rear housing adopted in an embodiment of the present disclosure.
Figure 8B:
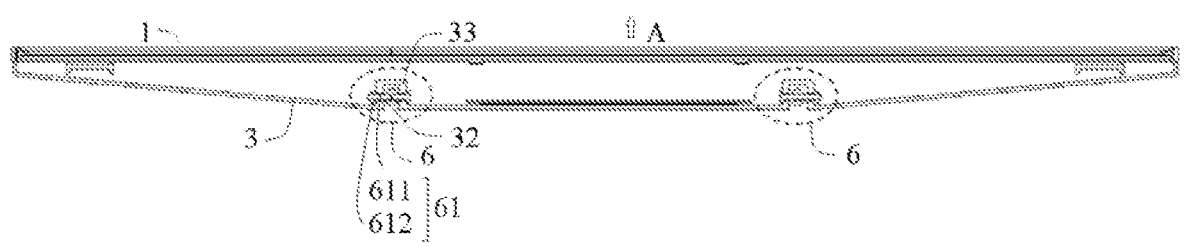
FIG. 8B is a cross-sectional view of the set perpendicular to a light-emitting surface of the display module and parallel to the first module mold frame according to an embodiment of the present disclosure.
Figure 8C:
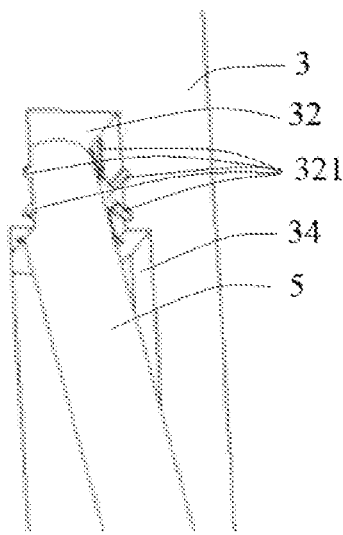
FIG. 8C is an enlarged view of an area III in FIG. 8A.
Figure 8D:
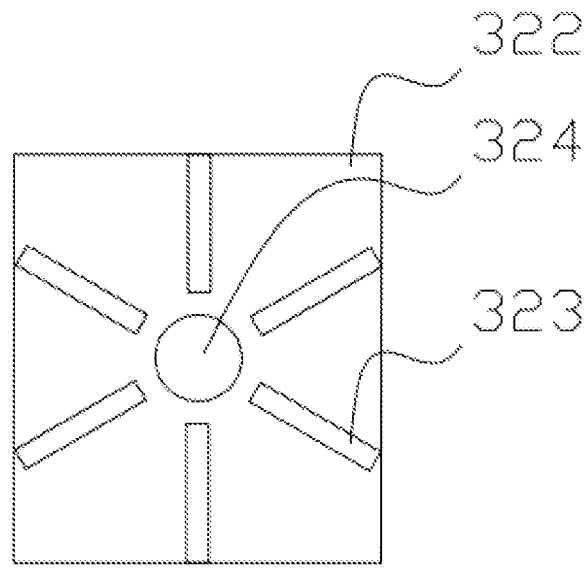
FIG. 8D is a front view of one side wall of a limiting groove.
Figure 8E:
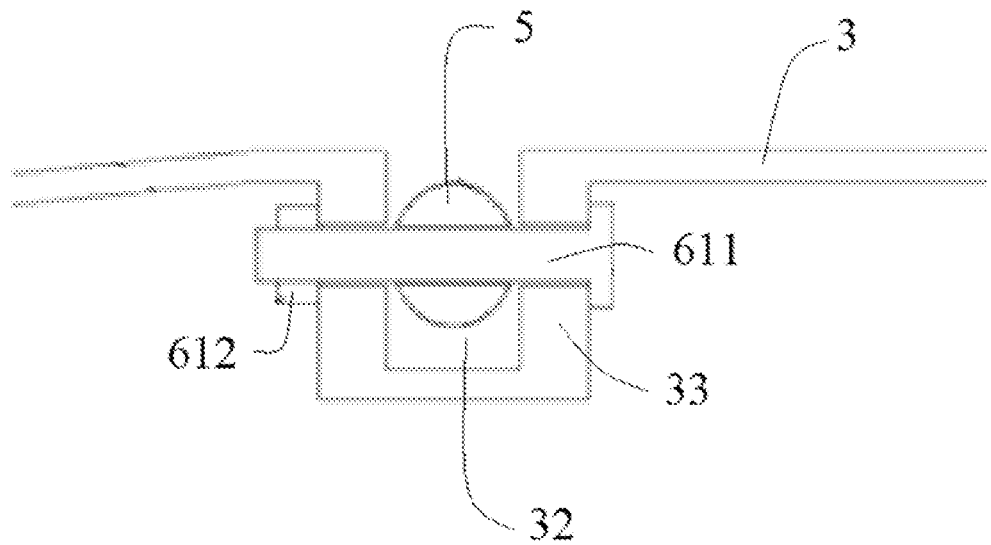
FIG. 8E is an enlarged view of an angle-adjustable component adopted in an embodiment of the present disclosure.
Figure 8F:
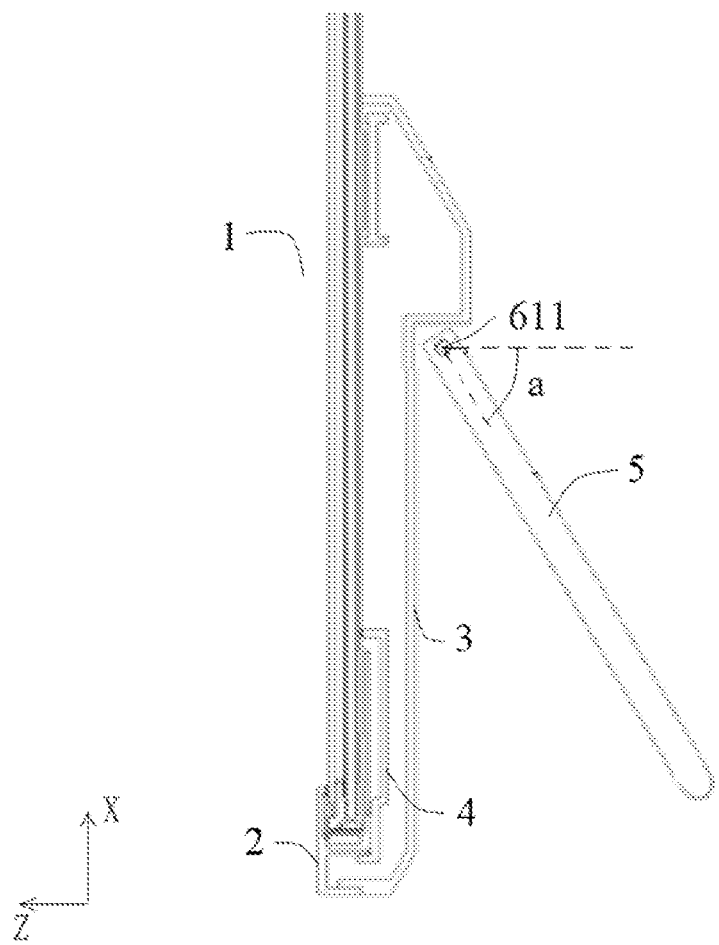
FIG. 8F is a partial cross-sectional view of the set perpendicular to the light-emitting surface of the display module and perpendicular to the first module mold frame according to an embodiment of the present disclosure.

In some optional embodiments, referring to FIG. 8A to FIG. 8F, the set further includes a stand 5 and an angle-adjustable component 6. The stand 5 is located on a side of the rear housing 3 away from the light-emitting surface of the display panel 17, and is connected to the rear housing 3 through the angle-adjustable component 6. The angle-adjustable component 6 is intended to adjust an included angle between the stand 5 and the light-emitting surface of the display panel 17 within a preset angle range, so that an angle between the light-emitting surface of the display panel 17 and the ground (i.e., a plane on which the set is placed) can be adjusted, and the set can be further suitable for various different application scenes. For example, as shown in FIG. 8F, the angle between the stand 5 and the light-emitting direction A is a, and the angle a can be adjusted by rotating the stand 5, and the angle a can be adjusted, for example, within a range of 0° to 90°.

In some optional embodiments, as shown in FIG. 8B, a limiting groove 32 is disposed on a surface of the rear housing 3 away from the light-emitting surface of the display panel 17. The angle-adjustable component 6 includes a fastening member 61. One end of the stand 5 is disposed in the limiting groove 32 in a damped rotation manner by the fastening member 61. The fastening member 61 is intended to adjust a damping amount of the stand 5. The damped rotation refers to that the stand 5 can only be rotated relative to the rear housing 3 under a certain force, and the intensity of the force can be adjusted by the fastening member 61. When the rotation of the stand 5 is stopped, the stand 5 stays at the current angle without shaking or shifting, such that the stand 5 is fixed at a desired angle.

In some optional embodiments, a raised and recessed structure 321 is formed on at least one side wall of the limiting groove 32, so as to increase friction force between the stand 5 and the limiting groove 32, so that the supporting function of the stand 5 would not be deteriorated after long-time use. For example, as shown in FIG. 8C and FIG. 8D, the raised and recessed structure 321 can be constituted by a plurality of bar-shaped grooves 323 formed on at least one of two side walls 322 of the limiting groove 32. Optionally, the plurality of bar-shaped grooves 323 are spaced around the axis of a first through hole 324 (to be described in detail later) provided in the limiting groove 32. In some optional embodiments, as shown in FIG. 8E, a surface of the rear housing 3 facing the light-emitting surface of the display panel 17 is provided with a mounting protrusion 33 on which the limiting groove 32 is formed. The mounting protrusion 33 is provided with a first through hole 324 penetrating through the mounting protrusion 33 along a rotation axis of the stand 5, and an end of the stand 5 is correspondingly provided with a second through hole. The fastening member 61 includes a fastening threaded connector, and a screw stem 611 of the fastening threaded connector is inserted through the first through hole and the second through hole. A nut 612 of the fastening threaded connector is threaded to the screw stem 611, and is intended to adjust the damping amount of the stand 5 by screwing or unscrewing. It will be readily appreciated that the friction between the stand 5 and the limiting groove 32 can be adjusted by screwing or unscrewing the nut 612, thus adjustment of the damping amount of the stand 5 is achieved. Of course, in practical applications, one end of the stand 5 can be disposed in the limiting groove 32 by the fastening member 61 in a damped rotation manner in any other way, and the present disclosure is not particularly limited to this.

In some optional embodiments, as shown in FIG. 8A, a receiving groove 34 is disposed on a surface of the rear housing 3 away from the light-emitting surface of the display panel 17, so as to receive the stand 5. By means of the receiving groove 34, the stand can be hidden in the rear housing 3, so that the portability of the set can be further improved.

Figure 9A:
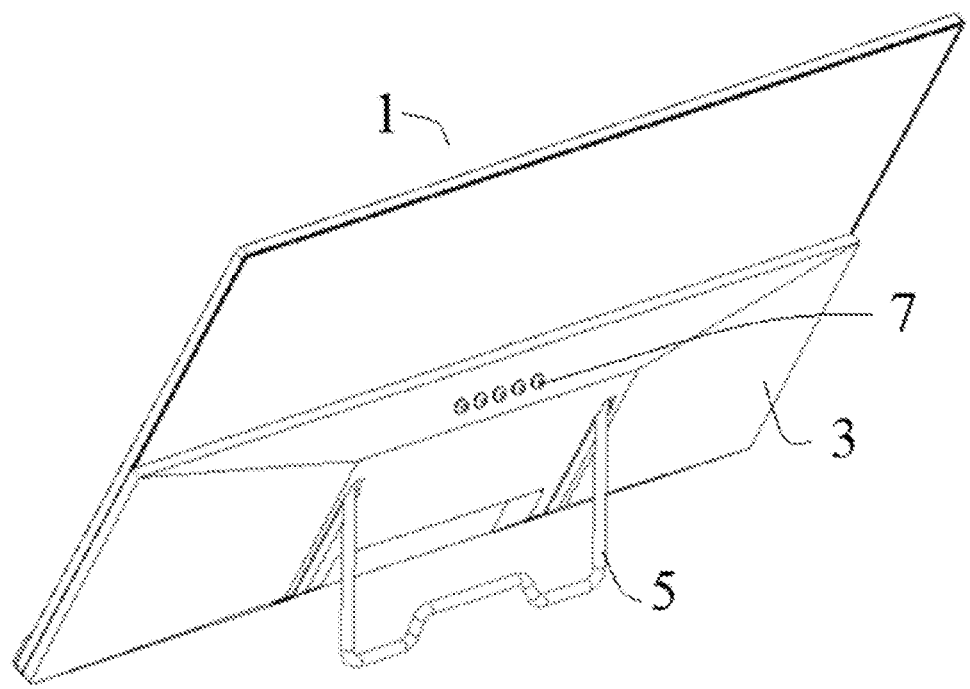
FIG. 9A is a structural view of the set being supported by a stand according to an embodiment of the present disclosure.
Figure 9B:
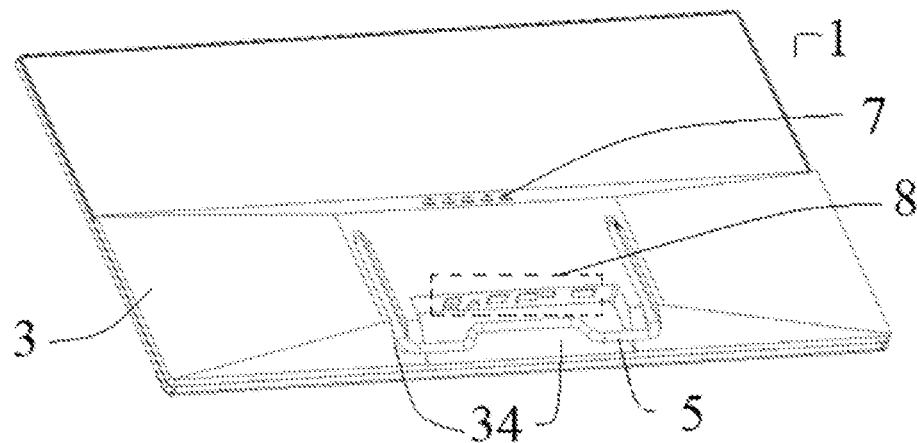
FIG. 9B is a structural view of the set not being supported by the stand according to an embodiment of the present disclosure.

Specifically, as shown in FIG. 9A, when the stand 5 performs supporting function, the display module 1 can be inclined with respect to the ground (i.e., a plane on which the display module 1 is placed), and the inclination angle is adjustable. As shown in FIG. 9B, when the stand 5 does not perform supporting function, the stand 5 is received in a receiving groove 34.

In some optional embodiments, as shown in FIG. 1, a plurality of through holes 35 are further provided on the rear housing 3, and a button structure 7 is further provided in a receiving space on an inner side of the rear housing 3. The button structure 7 is electrically connected to the system board 183, and serves as an input unit of the system board 183 to send an operation instruction input by a user to the system board 183. As shown in FIG. 9A, the buttons on the button structure 7 protrude to the outside of the rear housing 3 through the through holes 35, so as to facilitate user operation.

In some optional embodiments, as shown in FIG. 9B, an external connection hole 8 such as an interface is further provided on the rear housing 3.

As another technical scheme, an embodiment of the present disclosure further provides a display device, which includes the above-described set according to the embodiments of the present disclosure.

In summary, in the technical scheme of a set and a display device according to the embodiments of the present disclosure, at least part of a front housing is located on a light-emitting side of a display panel, and is disposed opposite to at least one side edge of a module mold frame, which facilitates minimizing the front housing, reducing the width of the side edge of the display module and the overall dimensions and the overall thickness of the set. Meanwhile, by disposing a first connecting structure and a second connecting structure on the front housing, the first connecting structure and the second connecting structure can cooperate with the third connecting structure disposed on a first module mold frame side edge of a module mold frame and a fourth connecting structure disposed on the backplane of the display module, respectively, so as to limit the position of the front housing in a plane parallel to the light-emitting surface of the display module and in a direction perpendicular to the light-emitting surface of the display panel. As compared to the existing technology that requires an additional metal frame to be fastened with the front housing, the present disclosure can dispense with the metal frame and reduce the weight of the set while ensuring structure connection stability, thereby decreasing the product cost and bringing forth characteristics of thinness, lightweight and portability to the set.

It should be understood that the above-mentioned embodiments are only exemplary embodiments for illustrating the principle of the present disclosure. However, the present disclosure is not limited thereto. For those skilled in the art, various modifications and improvements can be made without departing from the spirit and essence of the present disclosure, and these modifications and improvements are also deemed as falling within the protection scope of the present disclosure.

What is claimed is:

1. A set, comprising:
    a display module comprising a display panel, a module mold frame, a front housing and a backplane, wherein at least part of the front housing is located on a light-emitting side of the display panel and is disposed opposite to at least one side edge of the module mold frame; the front housing is provided with a first connecting structure and a second connecting structure, the module mold frame has a first module mold frame side edge, the first module mold frame side edge is provided with a third connecting structure, the backplane of the display module is provided with a fourth connecting structure, wherein,
    the first connecting structure and the third connecting structure cooperate with each other, so as to limit a position of the front housing in a plane parallel to a light-emitting surface of the display module;
    the second connecting structure and the fourth connecting structure cooperate with each other, so as to limit the position of the front housing in a direction perpendicular to the light-emitting surface of the display module;

wherein the front housing is strip-shaped in a plane parallel to the light-emitting surface of the display module, and is disposed opposite to the first module mold frame side edge;

wherein one of the first connecting structure and the third connecting structure comprises a first limiting hole, the other of the first connecting structure and the third connecting structure comprises a first limiting member, an axial direction of the first limiting hole is perpendicular to the light-emitting surface of the display module, and an outer peripheral surface of the first limiting member cooperates with an inner peripheral surface of the first limiting hole; and wherein one of the second connecting structure and the fourth connecting structure comprises a second limiting hole, the other of the second connecting structure and the fourth connecting structure comprises a second limiting member, an axial direction of the second limiting hole is parallel to a light-emitting surface of the display module, and the second limiting member and the second limiting hole cooperate with each other in a snap-fit manner.

2. The set of claim 1, wherein a portion of the display panel is exposed outside.

3. The set of claim 1, wherein shapes of orthographic projections of both the outer peripheral surface of the first limiting member and the inner peripheral surface of the first limiting hole on a plane parallel to the light-emitting surface of the display module comprise a rectangular shape or a square shape.

4. The set of claim 1, wherein a plurality of the first connecting structures and a plurality of the second connecting structures are provided, and the plurality of the first connecting structures are distributed along a length direction of the front housing, a number of the third connecting structures and a number of the first connecting structures are the same, and the third connecting structures and the first connecting structures are disposed in a one-to-one correspondence; and, the plurality of the second connecting structures are distributed along a length direction of the front housing, a number of the second connecting structures and a number of the fourth connecting structures are the same, and the second connecting structures and the fourth connecting structures are disposed in a one-to-one correspondence.

5. The set of claim 1, further comprising: a rear housing, at least part of the rear housing is located on a side away from the light-emitting surface of the display module, and the rear housing forms a receiving space in-between with the backplane; and a side of the rear housing corresponding to the first module mold frame side edge has a first rear housing flanging, a side of the front housing corresponding to the first module mold frame side edge has a first front housing flanging, the first front housing flanging being connected to the first rear housing flanging.

6. The set of claim 5, wherein one of the first rear housing flanging and the first front housing flanging is provided with a first cooperating portion, the other of the first rear housing flanging and the first front housing flanging is provided with a second cooperating portion, and the first cooperating portion and the second cooperating portion cooperate with each other, so as to limit a relative position of the front housing and the rear housing in a direction perpendicular to the light-emitting surface of the display module.

7. The set of claim 5, further comprising: a set mold frame disposed in the receiving space and connected to the backplane, and an orthographic projection of the set mold frame on the backplane at least covers an orthographic projection of a printed circuit board of the display module on the backplane.

8. The set of claim 7, wherein a side of the set mold frame corresponding to the first module mold frame side edge is provided with a first set mold frame flanging, the first set mold frame flanging is provided with a fifth connecting structure, a surface of the front housing opposite to the set mold frame is provided with a sixth connecting structure, and the fifth connecting structure and the sixth connecting structure cooperate with each other in a snap-fit manner.

9. The set of claim 8, wherein one of the fifth connecting structure and the sixth connecting structure comprises a third limiting hole, the other of the fifth connecting structure and the sixth connecting structure comprises a third limiting member, an axial direction of the third limiting hole is parallel to a light-emitting surface of the display module, and the third limiting member and the third limiting hole cooperate with each other in a snap-fit manner.

10. The set of claim 8, wherein a plurality of the fifth connecting structures are provided, and the plurality of the fifth connecting structures are distributed along a length direction of the set mold frame corresponding to the first set mold frame flanging, a number of the sixth connecting structures and a number of the fifth connecting structures are the same, and the sixth connecting structures and the fifth connecting structures are disposed in a one-to-one correspondence.

11. The set of claim 5, further comprising a stand and an angle-adjustable component, wherein the stand is located on a side of the rear housing away from the light-emitting surface of the display module, and is connected to the rear housing through the angle-adjustable component; the angle-adjustable component is intended to adjust an included angle between the stand and the light-emitting surface of the display module within a preset angle range.

12. The set of claim 11, wherein a surface of the rear housing away from the light-emitting surface of the display module is provided with a limiting groove, the angle-adjustable component comprises a fastening member, one end of the stand is disposed in the limiting groove in a damped rotation manner by the fastening member, and the fastening member is intended to adjust a damping amount of the stand.

13. The set of claim 12, wherein a raised and recessed structure is formed on at least one side wall of the limiting groove, so as to increase friction force between the stand and the limiting groove.

14. The set of claim 12, wherein a surface of the rear housing facing the light-emitting surface of the display module is provided with a mounting protrusion, and the limiting groove is formed on the mounting protrusion; and the mounting protrusion is provided with a first through hole penetrating through the mounting protrusion along a rotation axis of the stand, and an end of the stand is correspondingly provided with a second through hole; the fastening member comprises a fastening threaded connector, a screw stem of the fastening threaded connector is inserted through the first through hole and the second through hole, and a nut of the fastening threaded connector is threaded to the screw stem, so as to adjust the damping amount of the stand by screwing or unscrewing.

15. The set of claim 11, wherein a surface of the rear housing away from the light-emitting surface of the display module is provided with a receiving groove, so as to receive the stand.

16. A display device comprising the set of claim 1.

* * * * *